Feb. 14, 1939.    R. A. SANDBERG    2,147,613
AUTOMOBILE LOCKING STRUCTURE
Filed Dec. 27, 1937
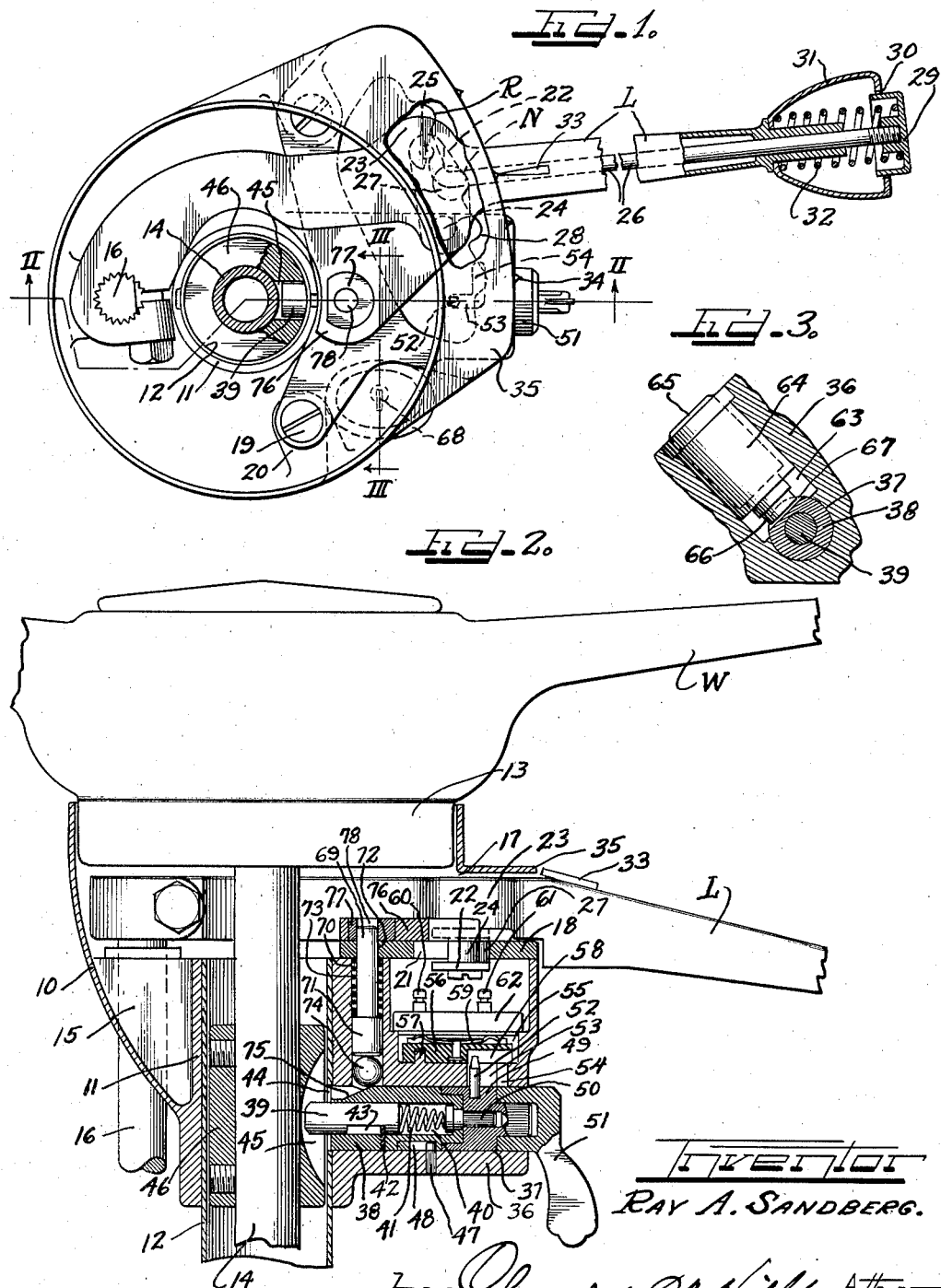
Inventor
Ray A. Sandberg.
by Charles O'Neill Attys.

Patented Feb. 14, 1939

2,147,613

UNITED STATES PATENT OFFICE 2,147,613

AUTOMOBILE LOCKING STRUCTURE

Ray A. Sandberg, Waukegan, Ill., assignor, by mesne assignments, to Houdaille-Hershey Corporation, Detroit, Mich., a corporation of Michigan Application December 27, 1937, Serial No. 181,873

3 Claims. (Cl. 70—239)

This invention relates to automobile locking structure and arrangement devised particularly for use in automobiles where the selection of the transmission gearing is by means of a lever mounted on the vehicle steering column, below the steering wheel mounted on the steering shaft which extends through the steering column.

An important object of the invention is to provide locking structures operable to lock the transmission selection controlling lever against operation and also to lock the steering and the ignition.

Another important object is to locate the locking structure within the supporting housing for the transmission selection controlling lever so that the supporting housing and the locking structure are in the form of a compact unitary assembly.

Another object is to combine the supporting housing body and the lock structure body as integral part of a die casting which encloses and protects the locking elements and the lever operating element.

The above enumerated and other features of the invention are incorporated in the structure disclosed on the drawing, in which drawing:

Figure 1 is a plan view of the supporting housing with parts in section broken away to more clearly show the arrangement;

Figure 2 is a section on plane II—II of Figure 1; and

Figure 3 is a section on plane III—III of Figure 1.

Briefly describing the transmission selection controlling lever structure, a bell shaped housing 10 has the sleeve 11 extending upwardly therein to receive and be rigidly secured to the upper end of the steering column 12 to be below the steering wheel W whose hub 13 is secured to the upper end of the steering shaft 14, the hub closing the upper end of the housing 10.

At one side of and within the housing 10 is the boss 15 for journaling the upper end of the transmission selection controlling shaft 16 which at its lower end is connected by suitable linkage or leverage with the selection means for the transmission gears.

The housing 10 has the side opening 17 through which the level L extends, the lever at its inner end within the housing being secured to the shaft 16. Below the lever is the quadrant plate 18 secured as by means of screws 19 to bosses 20 on the housing 10, the plate 18 having the opening 21 for the latch pawl structure 22 on the lever. The lever is hollow and has the enlargement 23 below which the pawl is located, the pawl being pivoted to the lever by a pin 24, a pin 25 at the free end of the pawl being connected with the rod 26 which extends outwardly through the lever. Intermediate its ends the latch pawl journals a latch roller 27 for cooperating with latching notches 28 in the quadrant plate. The notch N corresponds with the neutral setting of the transmission gears, the notch R corresponds with the reverse setting of the gears and the other notches correspond with the forward speed settings of the gears.

The rod 26 at its outer ends extends a distance beyond the lever body and has a button 29 secured thereto and projecting into the opening 30 in the knob frame 31 secured to the lever body, a spring 32 abutting the lever body and the button and tending to hold the latch rod 26 in outer position with the latching roller 27 yieldably engaged in the respective latching notches of the quadrant plate. The lever may have a pointer 33 thereon for cooperating with designations 34 on a shelf 35 extending from the housing 10 above the quadrant plate, the designations 34 aligning with the various latching notches. Pressure on the button 29 will release the latch pawl from the latching quadrant so that the lever may then be swung for selection of the desired transmission speed or direction, the latch mechanism then holding the lever in set position upon release of pressure on the button 29.

Describing now the locking structure, the supporting body 36 for the locking element is preferably an integral part of the housing body 10 and the bodies may form a part of an integral die casting. The body 36 has the bore 37 extending laterally at right angles to the steering column, and operable in the inner end of the bore is the lock bolt structure comprising the barrel 38 and the lock bolt 39, the lock bolt extending from the bore 40 in the barrel 38 to be urged outwardly by a spring 41, a key 42 engaging in the bolt slot 43 limiting the outward movement of the bolt. The steering column 12 has the opening 44 in its side through which the bolt 39 may be projected for engagement in the locking slot 45 in the bushing 46 secured to the steering shaft 14 so that the steering shaft and the steering wheel may be locked against steering movement. A pin 47 extends into the longitudinal channel 48 in the lock-bolt barrel to limit the axial movement of the barrel in the bore 37.

In the outer part of the bore 37 the switch actuating element 49 is located for axial movement with the lock bolt structure and for rotary movement relative thereto under certain conditions. The element 49 is secured to the pin 50 which journals in the inner end of the lock bolt barrel, the pin head holding element 49 against axial movement relative to the bolt barrel. The switch actuating lever 51 extends into the end of the bore 37 and is secured to the actuating element 49 so that a swing of the lever will rotate this element for switch operation.

The switch actuating element 49 has the switch actuating pin 52 extending therefrom into an L-slot in the body 36, the slot comprising the longitudinally extending part 53 and the transversely extending part 54. When the lock bolt structure is in locking position, the pin 52 is in the longitudinal leg of the L-slot so that the element 49 cannot be rotated for switch actuation, but when the lock bolt structure is in steering unlocking position the pin 52 will be in alignment with the transverse leg of the L-slot so that the element 49 may then be rotated for switch operation.

The switch mechanism is within the recess 55 above the bore 37. The switch comprises the switch block 56 receiving at its inner end the pivot projection 57 on the bottom of the recess 55, the longitudinally extending slot 57 in the outer end of the switch block receiving the end of the actuating pin 52 so that when the actuating element 49 is rotated the switch block will be swung laterally. On its outer side the switch block carries the switch blade 59 whose inner end is in axial alignment with the pivot projection 57 and the circuit terminal 60, the outer end of the switch blade being adapted for contact with the circuit terminal 61, these terminals being supported on a cover 62 for the recess 55. The terminal 60 may be connected with a source of power such as the automobile battery and is always in electrical engagement with the inner end of the switch blade, and the terminal 61 may connect with a circuit such as the ignition circuit and is normally to one side of the outer end of the switch blade for opening of the ignition circuit.

Axial shifting of the lock bolt and switch actuating assembly in the bore 37 is accomplished by the turning of a key. As best shown on Figure 3, the body 36 has the bore 63 extending radially therefrom and receiving the casing 64 of the cylinder lock structure whose cylinder 65 has a cam 66 at its inner end engaging it in the slot 67 in the lock bolt barrel 38 so that when the lock cylinder is turned by a suitable key inserted in the key hole 68, the lock bolt barrel may be shifted into steering locking position as shown in Figure 2, or to steering unlocking position, the switch actuating element 49 following the movement of the lock bolt barrel. When the steering is unlocked, the switch actuating pin 52 will come into alignment with the transverse leg of the L-slot so that upon forward swing of the lever 51 the switch block will be swung by the pin for engagement of the outer end of the switch blade with the circuit terminal 61 for closure of the ignition circuit. Relocking of the steering cannot be accomplished until the switch has been reopened and the pin 52 brought back into alignment with the longitudinal leg of the L-slot.

Describing now the arrangement for locking the transmission selection lever L, a locking pin 69 is shiftable in the bore 70 extending upwardly from the bore 37, the bore 70 terminating above the outer part of the lock bolt barrel 38. The pin 69 has the head 71 at its inner end and the outer end of the pin is slidable in the opening 72 through the quadrant plate 18. A spring 73 between the head 71 and the plate resists outward movement of the pin. In the lower end of the bore 70 is a ball 74 with which the incline or cam 75 on the lock bolt barrel 38 is cooperable. Extending from the lever L forwardly across the quadrant plate 18 is the flange or wing 76, which carries a bushing 77 provided with the passage 78 for receiving the locking pin 69, the location of the locking opening 78 being preferably such that it will be in alignment with the passageway 72 in the plate 18 when the lever is in position corresponding to the neutral condition of the transmission gearing. Then when the steering locking bolt structure is shifted to steering locking position, as shown in Figure 2, the cam incline 75 will raise the ball 74 and the locking pin 69 to project the pin into the locking passage 78 so as to lock the lever against operation. Upon shift of the steering locking bolt structure to unlocking position the cam 75 will permit the spring 73 to withdraw the pin 69 from the locking opening 78 for release of the lever L for transmission selection.

Figure 2 shows the lever L, the steering, and the ignition locked. To unlock, the key in the lock cylinder 65 is turned to shift the lock bolt structure outwardly to release the steering shaft and to withdraw the cam 75 from the ball 74 for release of the locking pin 69 from the lever L, and after such unlocking of the steering and the lever L, the ignition switch will be unlocked for switch opening or closure movement by the lever 51. Before relocking can be accomplished, the switch lever 51 must first be swung to open the switch, and the lever L must be moved to its neutral position for aligning the opening 78 with the locking pin 69, the inward shift of the steering lock bolt structure then effecting the locking of the steering and the transmission and the ignition. If the transmission selection controlling lever L is not in neutral position, the pin 69 will abut against the bottom of the wing 76 to prevent shift of the lock bolt structure to its steering locking position.

By intimately associating the locking structure with the supporting housing for the transmission controlling lever, a very compact assembly results in which the various locking and switch elements are all within the housing and fully protected. The entire assembly will also be above knee level so that in case of accidents the driver's knees or other parts of his person cannot come into harmful contact with the structure.

I have shown a practical and efficient embodiment of the various features of my invention but I do not desire to be limited to the exact construction, arrangement and operation shown and described as changes and modifications may be made without departing from the scope of the invention.

I claim as follows:

1. Lock structure for locking the steering wheel structure and the transmission selection lever structure in an automotive vehicle, comprising a housing mounted below said structure, a steering locking bolt shiftable in said housing for locking the steering wheel structure, a second locking bolt shiftable vertically below said lever structure, means for withholding said second locking bolt from said lever structure when said steering locking bolt is in unlocking position, and cam means effective upon shift of said steering locking bolt into steering locking position for shifting said second bolt into locking engagement with said lever structure.

2. Lock structure for the steering wheel structure and transmission selection lever structure in an automotive vehicle, comprising a housing mounted below said structure, a steering locking bolt shiftable laterally in said housing into locking or unlocking position relative to said steering wheel structure, a second locking bolt shiftable vertically in said housing relative to said lever structure, means for withholding said second lock bolt from said lever structure when said steering locking bolt is in steering unlocking position, and cam means for camming said second bolt into interlocking engagement with said lever structure when said steering locking bolt is shifted to steering locking position, an electrical switch within said housing, and a connection between said switch and said steering locking bolt operable to release said switch for operation when said steering locking bolt is in unlocking position and for locking said switch in circuit opening position when said steering locking bolt is in steering locking position.

3. Locking mechanism for the steering wheel structure and the transmission selection lever extending laterally below the steering wheel, comprising a housing mounted below the steering wheel and the lever structure, steering locking bolt shiftable horizontally in said housing into locking or unlocking position relative to said steering wheel structure, a second lock bolt shiftable vertically between the inner end of said steering locking bolt and said lever structure, means holding said second bolt withdrawn from said lever structure when said steering locking bolt is in unlocking position, a cam connection between said bolt operable to shift said second bolt into locking engagement with said lever structure when said steering locking bolt is moved to locking position, an electrical switch within said housing, and a connection between said steering locking bolt and said switch operable to lock said switch in circuit opening condition when said bolt is in locking position and to release said switch for circuit control when said bolt is moved to unlocking position.

RAY A. SANDBERG.